(12) United States Patent
Huerta-Ochoa et al.

(10) Patent No.: US 7,938,382 B2
(45) Date of Patent: May 10, 2011

(54) SYSTEM AND METHOD OF STEP DETECTION FOR A STEPPER MOTOR

(75) Inventors: Ruben Huerta-Ochoa, O'Fallon, MO (US); Alex Zhang, Suzhou (CN); Paul Ren, Zhang (CN)

(73) Assignee: Emerson Electric Co.,, Sr. Louis, MO (US)

( * ) Notice: Subject to any disclaimer, the term of this patent is extended or adjusted under 35 U.S.C. 154(b) by 163 days.

(21) Appl. No.: 12/484,843

(22) Filed: Jun. 15, 2009

(65) Prior Publication Data

US 2010/0314566 A1    Dec. 16, 2010

(51) Int. Cl.
    *F16K 31/02*    (2006.01)
(52) U.S. Cl. .............. 251/129.13; 251/129.11; 318/685; 318/696
(58) Field of Classification Search ............ 251/129.11, 251/129.12, 129.13; 318/685, 696
    See application file for complete search history.

(56) References Cited

U.S. PATENT DOCUMENTS

| | | | |
|---|---|---|---|
| 3,842,331 A | 10/1974 | Hendrickson et al. | |
| 4,137,491 A | 1/1979 | Bartley et al. | |
| 4,618,808 A | 10/1986 | Ish-Shalom et al. | |
| 4,963,808 A * | 10/1990 | Torisawa et al. | 318/685 |
| 4,970,423 A | 11/1990 | Tamae et al. | |
| 5,006,772 A | 4/1991 | Danby | |
| 5,227,709 A | 7/1993 | Gauthier et al. | |
| 5,316,263 A | 5/1994 | Mino | |
| 5,378,975 A | 1/1995 | Schweid et al. | |
| 5,674,169 A * | 10/1997 | Yang | 483/32 |
| 5,691,613 A | 11/1997 | Gutwillinger | |
| 5,783,939 A | 7/1998 | Lippmann et al. | |
| 5,886,504 A * | 3/1999 | Scott et al. | 322/15 |
| 6,667,595 B2 | 12/2003 | Wiseman | |
| 6,870,346 B2 | 3/2005 | Davidov | |
| 7,116,070 B2 | 10/2006 | MacKay | |

* cited by examiner

*Primary Examiner* — John K Fristoe, Jr.
(74) *Attorney, Agent, or Firm* — Harness, Dickey & Pierce, P.L.C.

(57) ABSTRACT

A stepper motor and controller are provided for controllably adjusting the angular displacement of a rotor. The stepper motor has a plurality of stator coils that are configured to effect rotation of the rotor upon application of a voltage thereto. The stepper motor further includes one or more sensing coils, where rotation of the rotor generates an induced voltage in the one or more sensing coils. A controller is included for processing the induced voltage signals, and is configured to output a constant vector value that does not change in value where the induced voltage signals are indicative of the rotor rotating in a continuous manner, and to output a diverging vector value where the induced voltage signals are indicative of the rotor being inhibited from rotating. The controller is configured to determine the rotor's angular displacement from the constant vector value, and to detect occurrence of the rotor being inhibited from rotating from a diverging vector value.

20 Claims, 11 Drawing Sheets

SYSTEM AND METHOD OF STEP DETECTION FOR A STEPPER MOTOR

FIELD OF THE INVENTION

The present disclosure relates to flow control valves, and more particularly to motor actuated modulating flow control valves.

BACKGROUND

The statements in this section merely provide background information related to the present disclosure and may not constitute prior art.

In a conventional refrigeration or HVAC system, flow control devices are typically utilized to control the flow of working fluids in a refrigeration system. In general, the refrigeration system would include a compressor that forces the particular refrigerant used in the system through a condensing coil, where the refrigerant vapor liquefies. The liquid refrigerant passes through a thermostatic expansion valve, expanding the high pressure liquid refrigerant to a low pressure vapor. The low pressure, low temperature refrigerant discharged from the thermostatic expansion valve is then directed through an evaporator coil for absorbing heat and thus refrigerating the space inside the container surrounding the evaporator coil.

The thermostatic expansion valve functions to meter the flow of refrigerant into the evaporator coil in proportion to the rate of evaporation of the refrigerant in the evaporator coil, and is responsive to the temperature and pressure of the refrigerant leaving the evaporator coil. In this manner, the thermostatic expansion valve is intended to control flow so that the refrigerant leaves the evaporator coil at a predetermined superheat. Generally, the superheat of the refrigerant is a measure of the heat contained in the refrigerant vapor above its heat content at the boiling point (saturated vapor temperature) at the existing pressure. Maintaining the refrigerant entering the suction line from the evaporator coil at a desired superheat level enhances the refrigeration system performance.

Thermal expansion valves are typically used, in conjunction with a suction regulator, to maintain a consistent evaporator coil pressure. In known systems, conventionally designed mechanical pressure regulators are used for this purpose. Conventional mechanical pressure regulators include a throttling element that, when moved, limits the flow of the refrigerant through the suction regulator to regulate the pressure. A diaphragm, or other sensing element, responds to variations in the inlet pressure and moves the throttling element accordingly. A reference pressure, typically exerted by a spring, is applied to one side of the diaphragm to bias the diaphragm in a desired position, or set point. High side inlet pressure is applied to the other side of the diaphragm to move the diaphragm against the spring, and thus, move the throttling element.

In many refrigeration system implementations, finer temperature control is desirable. Adjusting the setting of conventionally designed mechanical pressure regulators in such thermal expansion valves can be a time consuming, manual process. Moreover, if the refrigerant or desired temperature changes, the complicated process of manually adjusting the pressure regulators set screw must be repeated.

SUMMARY

This section provides a general summary of the disclosure, and is not a comprehensive disclosure of its full scope or all of its features.

The present disclosure relates to various embodiments of a stepper motor and a controller that are configured to control rotation of a stepper motor. The various embodiments include a stepper motor in combination with a controller, for controllably adjusting the angular displacement of a rotor of the stepper motor. The stepper motor has a stator, and a rotor that may be coupled to a shaft. The stator has a plurality of stator coils disposed therein, which define at least two phases. The stator coils are configured to effect rotation of the rotor upon application of a voltage to the stator coils, for rotatably stepping the rotor to a desired angular displacement.

The various embodiments further include one or more sensing coils disposed in the stator such that rotation of the rotor generates an induced voltage in each of the one or more sensing coils. Each of the one or more sensing coils are configured to output at least one induced voltage signal. The various embodiments further include a controller for applying a voltage to the plurality of stator coils, for controllably rotating the rotor to a desired angular displacement position. The controller further processes the induced voltage signals from the one or more sensing coils. The controller may comprise one or more circuits configured to process the sensing coil signals and to control the application of voltage to the stepper motor. The controller may further include a microprocessor in connection with the one or more circuits. Based on the signals from the sensing coils, the controller is configured to output a constant vector value that does not change in value where the induced voltage signals are indicative of the rotor rotating in a continuous manner, and further configured to output a diverging vector value where the induced voltage signals are indicative of the rotor being inhibited from rotating in a continuous manner. The controller is further configured to determine the angular rotor displacement of the rotor based on the duration of a constant vector value derived from the induced voltage signal from the one or more sensing coils. The controller is further configured to detect the occurrence of a diverging vector value indicative of the rotor being inhibited from rotating in a continuous manner, and to resume tracking the rotor step position upon restoration of the constant vector value that is indicative of continuous rotation of the rotor, to thereby track the rotor's actual angular displacement position with precision.

According to one aspect of the present disclosure, at least one embodiment of a controller in combination with a stepper motor is provided, which may be coupled to a rotatable component such as a rotating valve element for adjustably varying fluid flow through a valve. In at least one embodiment, a stepper motor in combination with a controller and a valve is provided for controllably adjusting the valve to vary fluid flow therethrough. The combination includes a valve element that is configured to be rotatably displaced to adjustably vary the fluid flow rate through a valve, and a shaft rotatably coupled to the valve element. The combination includes a stepper motor having a rotor coupled to the shaft, and a stator. The stator has a plurality of stator coils therein defining at least two phases that are configured to effect rotation of the rotor upon application of a voltage to the plurality of stator coils, for rotatably stepping the rotor to a desired angular displacement. The first and second sensing coils are positioned adjacent to at least two of the plurality of stator coils and disposed in the stator such that rotation of the rotor generates an induced voltage in each of the first and second sensing coils. The first sensing coil is configured to output an induced voltage signal of a first phase and the second sensing coil is configured to output an induced voltage signal of a second phase. The combination further includes a signal conditioning circuit configured to process the induced voltage signal of a first phase from the first sensing coil and the induced voltage signal of a second phase from the second sensing coil. The signal conditioning circuit is configured to output a constant vector value that is constant and unchanging where the rotor rotates in a continuous manner, and to output a diverging vector value that differs from the constant vector value where the rotor is being inhibited from rotating in a continuous manner. A microprocessor circuit is further included, and is configured to control the application of a voltage to the plurality of stator coils, for controllably rotating the rotor and shaft coupled thereto to a desired angular displacement for adjustably varying the fluid flow through the valve. The microprocessor is configured to determine the angular displacement of the rotor based on the communication of a continuous constant vector value, derived from the induced voltage signal of a first phase from the first sensing coil and induced voltage signal of a second phase from the second sensing coil. The microprocessor circuit is further configured to detect the occurrence of a diverging vector value indicative of the rotor being inhibited from rotating in a continuous manner, and to resume tracking the rotor step position upon restoration of the constant vector value that is indicative of continuous rotation of the rotor, to thereby track the rotor's actual angular displacement position with precision.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure in any way.

Corresponding reference numerals indicate corresponding parts throughout the several views of the drawings.

DETAILED DESCRIPTION

Figure 1:
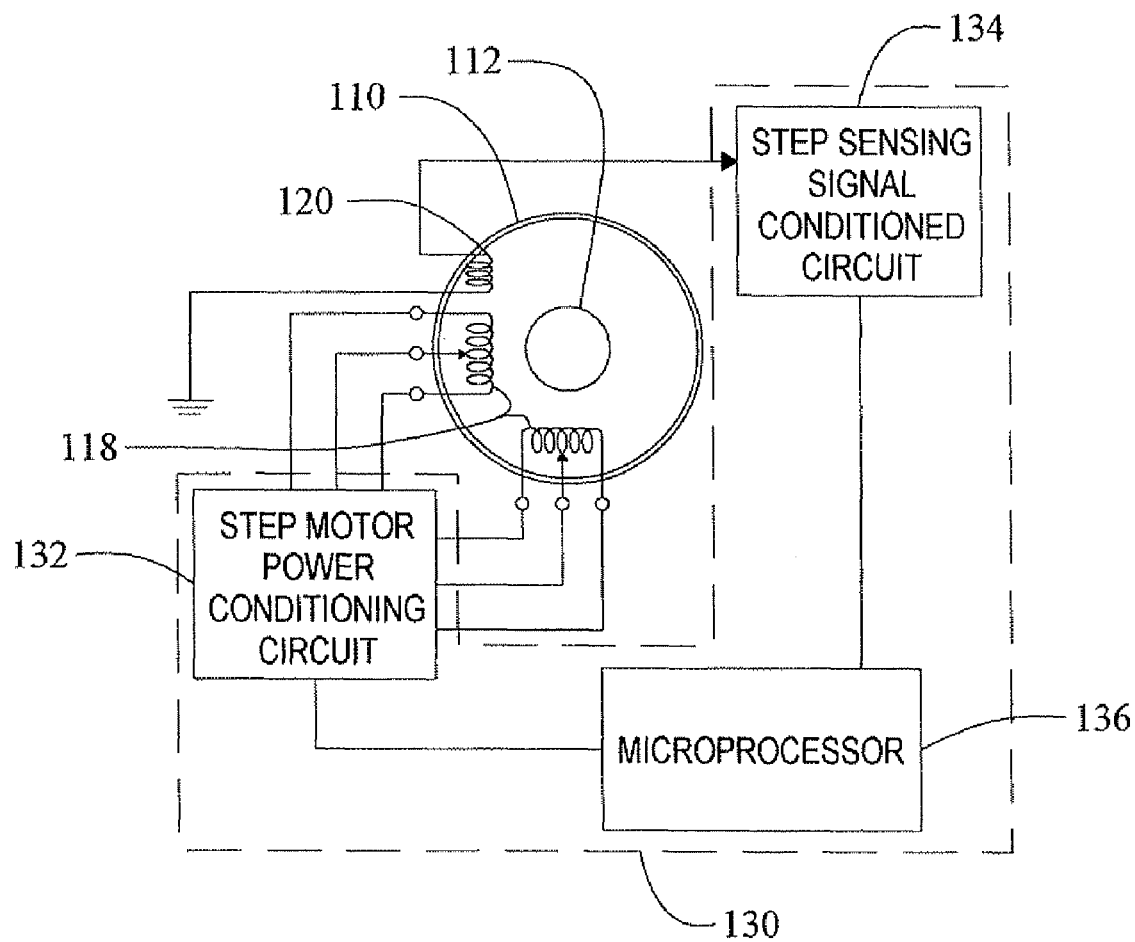
FIG. 1 is a schematic diagram showing a first embodiment of a stepper motor in combination with a controller, in accordance with the principles of the present disclosure.

In the following description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developers specific goals, such as compliance with system-related constraints. Such a development effort might be complex, but is nevertheless a routine undertaking of design, fabrication and manufacture for those of ordinary skill.

According to various aspects of the present disclosure, there are provided various exemplary embodiments of a stepper motor and controller for controlling rotation of a stepper motor. The stepper motor may be coupled to a rotatable component, such as a rotating valve element for adjustably varying fluid flow through a valve. In at least one embodiment, a stepper motor in combination with a controller is provided, for controllably adjusting the angular displacement of a rotor of the stepper motor. The stepper motor has a stator, and a rotor that may be coupled to a shaft. The stator has a plurality of stator coils disposed therein, which define at least two phases. The stator coils are configured to effect rotation of the rotor upon application of a voltage to the stator coils, for rotatably stepping the rotor to a desired angular displacement.

The various embodiments further include one or more sensing coils disposed in the stator such that rotation of the rotor generates an induced voltage in each of the one or more sensing coils. Each of the one or more sensing coils are configured to output at least one induced voltage signal. The various embodiments further include a controller for applying a voltage to the plurality of stator coils, for controllably rotating the rotor to a desired angular displacement position. The controller further processes the induced voltage signals from the one or more sensing coils. The controller may comprise one or more circuits configured to process the sensing coil signals, and to control the application of voltage to the stepper motor. The controller may further include a microprocessor in connection with the one or more circuits. Based on the signals from the sensing coils, the controller is configured to output a constant signal value that does not change in value where the induced voltage signals are indicative of the rotor rotating in a continuous manner. The controller is further configured to output a diverging vector value where the induced voltage signals are indicative of the rotor being inhibited from rotating in a continuous manner. The controller is further configured to determine the angular rotor displacement of the rotor based on the duration of a constant vector value derived from the induced voltage signal from the one or more sensing coils. The controller is further configured to detect the occurrence of a diverging vector value indicative of the rotor being inhibited from rotating in a continuous manner, and to resume tracking the rotor step position upon restoration of the constant vector value that is indicative of continuous rotation of the rotor, to thereby track the rotor's actual angular displacement position with precision.

Referring to FIG. 1, a schematic is shown of a first embodiment of a stepper motor 110 in combination with a controller 130. The stepper motor 110 in combination with the controller 130 provides for controllably adjusting the angular displacement of a rotor 112 of the stepper motor 110. The stepper motor 110 has a rotor 112, and a plurality of stator coils 118 defining at least two phases (A and B). The controller 130 controls the application of voltage (at 132) to the plurality of stator coils 118. Upon application of voltage, the plurality of stator coils 118 are configured to effect rotation of the rotor 112. The controller 130 is further configured to process signals (at 134) that are received from one or more sensing coils 120, for sensing step rotation of the rotor 112. The controller 130 may comprise one or more circuits 132, 134, including a signal conditioning circuit 134 configured to process signals from the sensing coils 120, and a voltage application circuit 132 to control the application of voltage to the stator coils 118. The controller 130 may further include a microprocessor 136 in connection with the above circuits, but may alternatively comprise any circuitry suitable for controlling application of voltage and processing of sensor signals, such as, but not limited to, a Digital Signal Processor, Programmable Logic Controller (PLC), or a computer.

Figure 2:
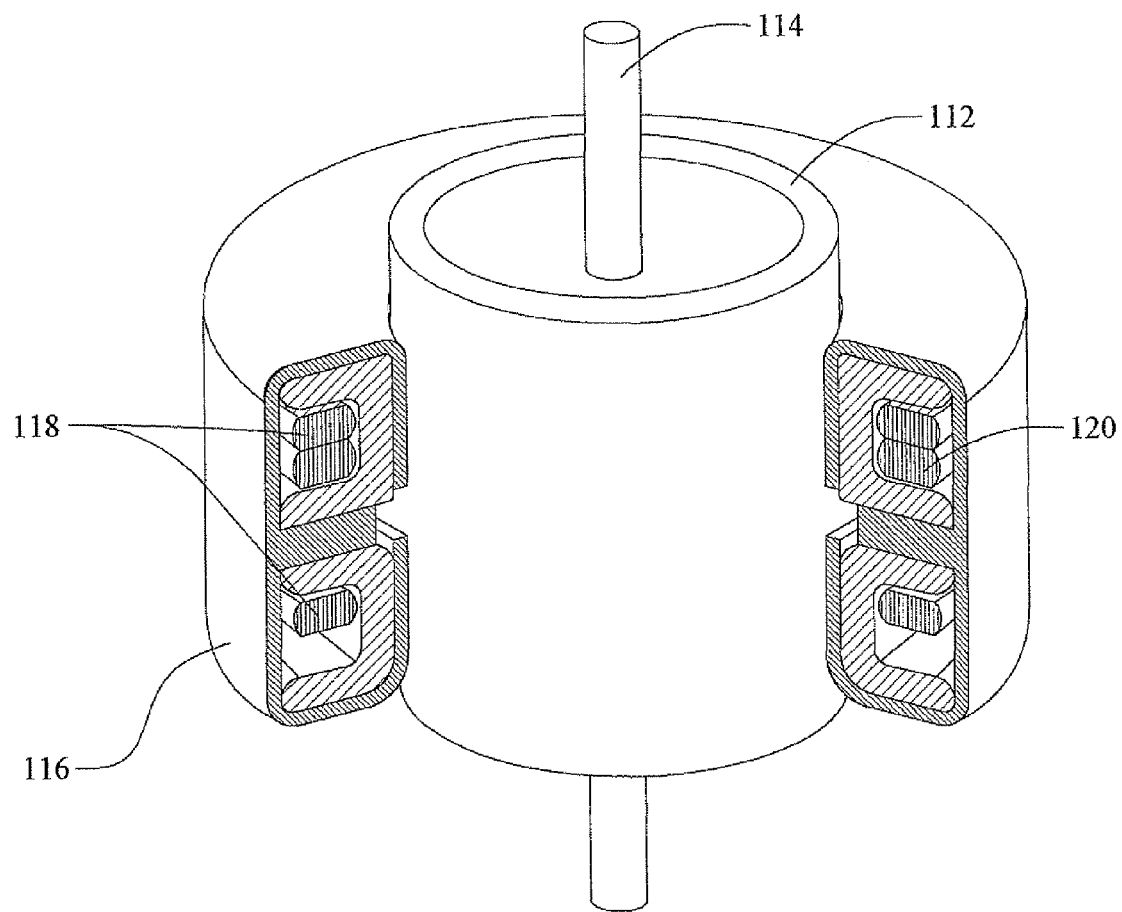
FIG. 2 is a cross-sectional perspective view of the stepper motor in the first embodiment.

Referring to FIG. 2, the stepper motor 110 has a rotor 112 coupled to a shaft 114, and a stator 116. The stator 116 has a plurality of stator coils 118 therein, defining at least two phases (A and B). Upon application of a voltage to the plurality of stator coils 118, the stator coils 118 are configured to effect rotation of the rotor 112 for rotatably stepping the rotor 112 to a desired angular displacement. The first embodiment further includes one or more sensing coils 120 disposed in the stator 116, such that rotation of the rotor 112 generates an induced voltage in each of the one or more sensing coils 120, which are configured to output an induced voltage signal. While the first embodiment shown in FIG. 1 has a single sensing coil 120, it should be noted that the first embodiment (and other embodiments) may further comprise two or more sensing coils.

The first embodiment further include a controller 130 that applies a voltage to the plurality of stator coils 118 for controllably rotating the rotor 112 to a desired angular displacement position. The controller 130 further processes the induced voltage signals from the one or more sensing coils 120. Based on the signals from the one or more sensing coils 120, the controller 130 is configured to determine a signal value, which remains at a constant value that does not change where the induced voltage signal from the one or more sensing coils 120 are indicative of the rotor 112 rotating in a continuous manner. Similarly, the controller 130 is configured to provide a diverging signal value where the induced voltage signal from the one or more sensing coils 120 are indicative of the rotor 112 being inhibited from rotating in a continuous manner. For example, the controller 130 may be configured to look up a stored reference voltage waveform representative of continuous rotor rotation for comparison purposes, and determine the difference between the reference voltage waveform and the induced voltage signal from the sensing coil 120. If the difference or value determined at each interval is the same (e.g.,—remains at a constant value that does not change), the induced voltage signal from the sensing coil 120 would be indicative of the rotor 112 rotating in a continuous manner (much like the reference waveform representative of rotor rotation in a continuous manner). If the difference in value between the induced voltage and the reference voltage is determined to be diverging or different from the constant value, the induced voltage signal from the sensing coil 120 would be indicative of the rotor 112 being inhibited from rotating in a continuous manner. In this manner, the controller 130 can detect whether the rotor 112 is rotating in a continuous manner or is being inhibited from rotating in a continuous manner.

The controller 130 is further configured to determine the angular displacement of the rotor 112 based on the signal value derived from the induced voltage signal from the one or more sensing coils 120. The controller 130 accordingly controls application of voltage to the plurality of stator coils 118 to effect rotation of the rotor 112, which causes an induced current in the one or more sensing coils 120 from which the controller 130 determines a signal value that indicates whether or not the rotor 112 is rotating continuously. The controller may further track this signal value to determine the angular or rotational displacement of the rotor 112.

The controller 130 is further configured to detect the occurrence of a diverging signal value indicative of the rotor 112 being inhibited from rotating in a continuous manner. Upon detecting a diverging value indicating that the rotor is inhibited from rotation, the controller 130 is configured to resume tracking the rotor step position upon restoration of a constant signal value that is indicative of continuous rotation of the rotor, to thereby track the rotor's actual angular displacement position with precision.

Figure 3:
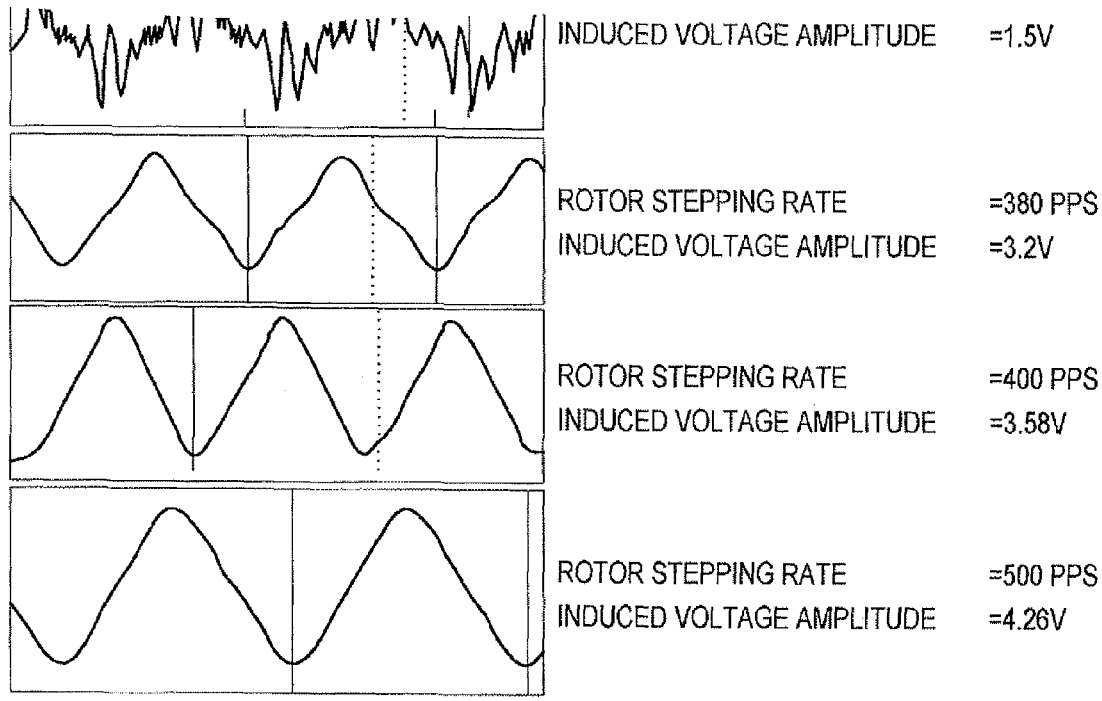
FIG. 3 shows a number of plots of examples of an induced voltage generated in the one or more sensing coils of the stepper motor in FIGS. 1 and 2, in accordance with the principles of the present disclosure.

With regard to the induced voltage generated in the one or more sensing coils 120, a number of induced voltage signal examples are shown in the plots in FIG. 3. The induced voltage signals in each of the plots shown in FIG. 3 each correspond to different stepping frequencies, ranging from 90 pulses per second (or steps per second) of the rotor, to 500 pulses per second. It should be noted that in the various plots, the induced voltage amplitude increases as the rotor stepping rate increases.

Figure 4:
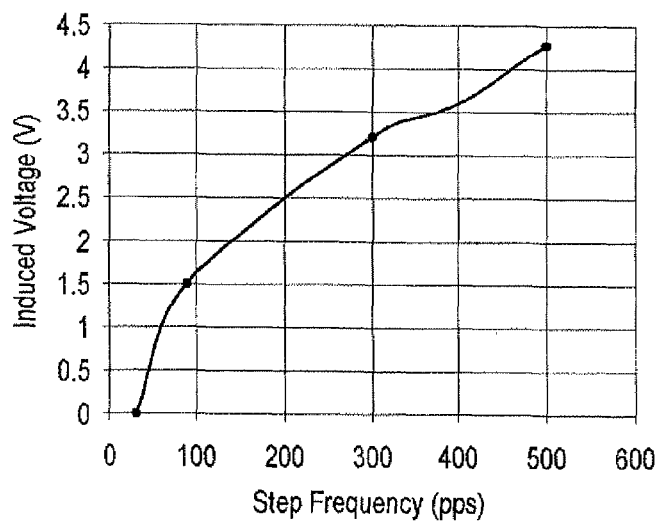
FIG. 4 is a graph summarizing the data from the induced voltage plots in FIG. 3, which shows the amplitude of the induced voltage plotted against the corresponding rotor stepping rate in pulses per second.

The results of the plots are summarized in the graph shown in FIG. 4, which shows the amplitude of the induced voltage plotted against the corresponding rotor stepping rate in pulses per second. The graph shows that the amplitude of the induced voltage in the sensing coil 120 is proportional to the angular speed or stepping rate of the rotor 112. This relationship between induced voltage in the sensing coil 120 and the angular speed or stepping rate of the rotor 112 can be utilized to determine the angular speed of the rotor rotation based on the amplitude of the induced voltage sensed by the controller 130. If the induced voltage is measured at zero volts, for example, when the controller 130 applies a voltage to the plurality of stator coils for effecting rotation of the rotor 112, it can be concluded that the rotor 112 failed to complete the desired step rotation (thereby failing to induce a voltage in the sensing coil), which would signal a rotor mis-step.

It should be noted that in an alternate construction of the first embodiment, the one or more sensing coils 120 may comprise two or more sensing coils. In this alternate construction, the induced voltage signal from the two or more sensing coils 120 may be utilized as mathematical components that are used in defining a vector signal for indicating the rotational displacement or position of the rotor. The alternate construction of the first embodiment may further comprise a signal conditioning circuit 134 that processes the induced voltage signal from the two or more sensing coils 120. The signal conditioning circuit 134 may be configured to output a constant signal value (such as a vector value, for example, where the induced voltage signal from the first and second sensing coils 220, 222 may be utilized as mathematical components that are used in defining the vector signal). Where the value determined from the two induced voltage signals from the two or more sensing coils 120 is constant, the constant vector value indicates continuous uninterrupted rotation of the rotor. Where the vector value diverges from a constant value, the induced voltage signals from the two or more sensing coils are indicative of the rotor being inhibited from rotating in a continuous manner. Thus, the alternate construction comprising two or more sensing coils provides for determining a signal value that, when constant, corresponds to constant rotation, and corresponds to the rotor being inhibited from rotating where the signal diverges from the constant value. Based on this, the controller 130 may be configured to detect the rotor's angular displacement position by tracking the constant signal value derived from the induced voltage signal that is indicative of continuous rotation of the rotor, to thereby track the rotor's angular displacement or position.

Figure 5:
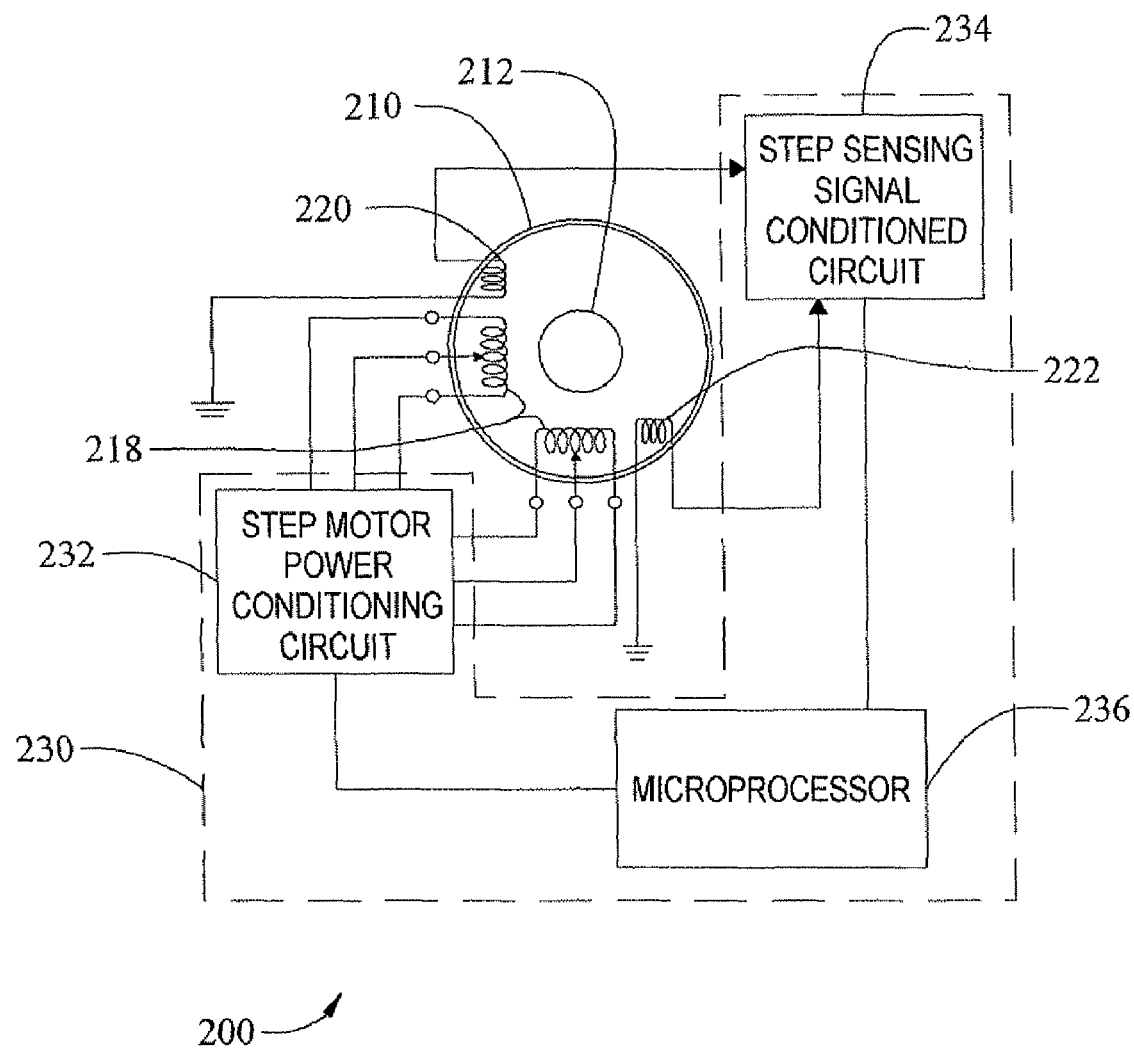
FIG. 5 is a schematic diagram showing a second embodiment of a stepper motor in combination with a controller and a valve, in accordance with the principles of the present disclosure.

Referring to FIG. 5 a schematic is shown of a second embodiment 200 of a stepper motor 210 in combination with a controller 230 and a flow expansion valve 240, which provide for controllably adjusting the flow expansion valve 240 to vary fluid flow therethrough. The stepper motor 210 in combination with the controller 230 provides for controllably adjusting the angular displacement of a rotor 212 of the stepper motor 210. The stepper motor 210 has a rotor 212, a stator 216, and a plurality of stator coils 218 defining at least two phases (A and B). The controller 230 controls the application of voltage (at 232) to the stator coils 218, which are configured to effect rotation of the rotor 212 upon application of a voltage thereto. The controller 230 is further configured to process signals (at 234) that are received from first and second sensing coils 220, 222 for sensing step rotation of the rotor 212. The controller 230 may comprise a signal conditioning circuit 234 configured to process the induced voltage signals and a voltage application circuit 232 to control the application of voltage to the stepper motor, and may further included a microprocessor 236, each of which will be discussed in further detail below.

Figure 6:
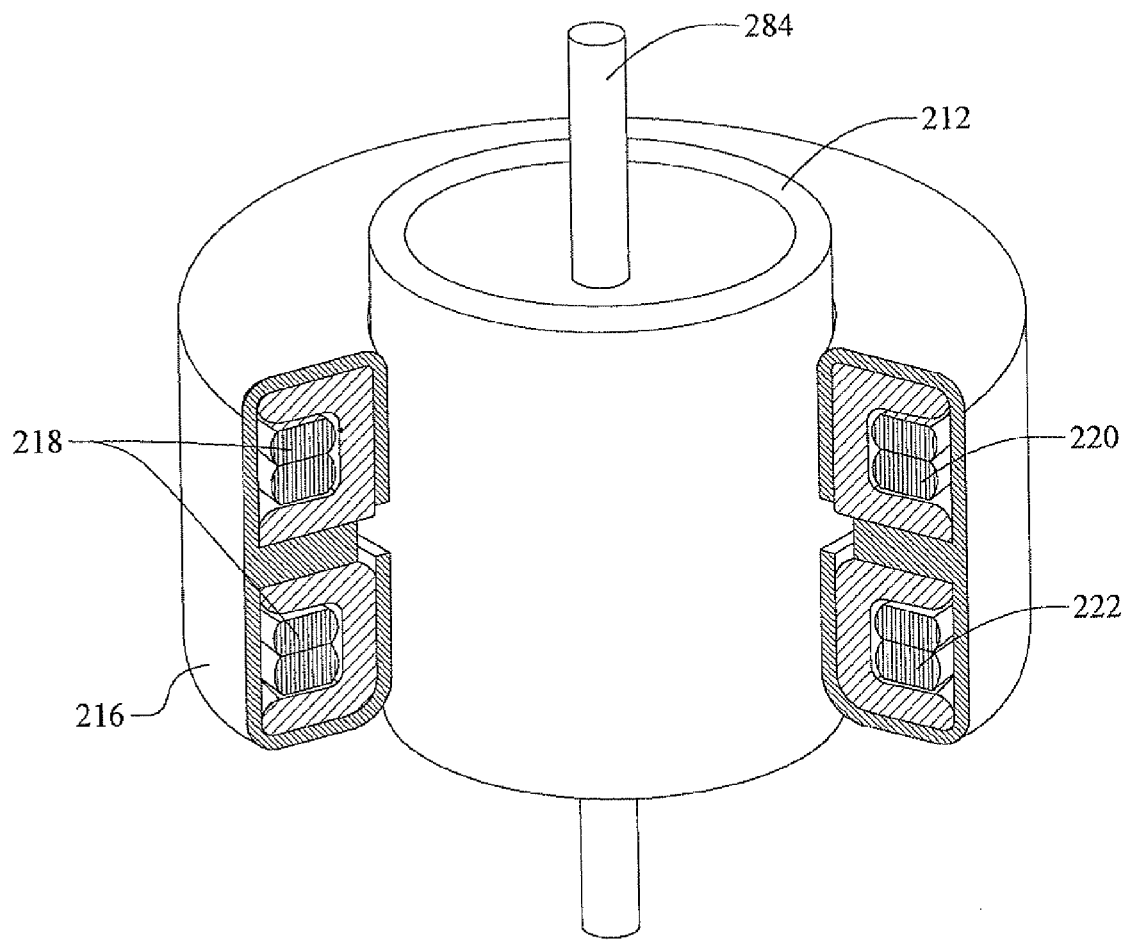
FIG. 6 is a cross-sectional perspective view of the stepper motor in the second embodiment.

Referring to FIG. 6, the stepper motor 210 has a rotor 212 coupled to a shaft 284, and a stator 216. The second embodiment further includes a valve element or modulating disk 260 disposed within the flow expansion valve 240 that is rotatably coupled to the shaft 284, and is configured to be rotatably displaced to adjustably vary the fluid flow rate through the flow expansion valve 240. The stator 216 has a plurality of stator coils 218 therein, defining at least two phases (A and B). Upon application of voltage to the stator coils 218, the stator coils are configured to effect rotation of the rotor 212, for rotatably stepping the rotor 212 to a desired angular displacement. The second embodiment further includes first and second sensing coils 220, 222 disposed in the stator 216 and positioned adjacent to the at least two of the plurality of stator coils 218. The first and second sensing coils 220, 222 are disposed in the stator such that rotation of the rotor 212 generates an induced voltage in each of the first and second sensing coils 220, 222.

Figure 7:
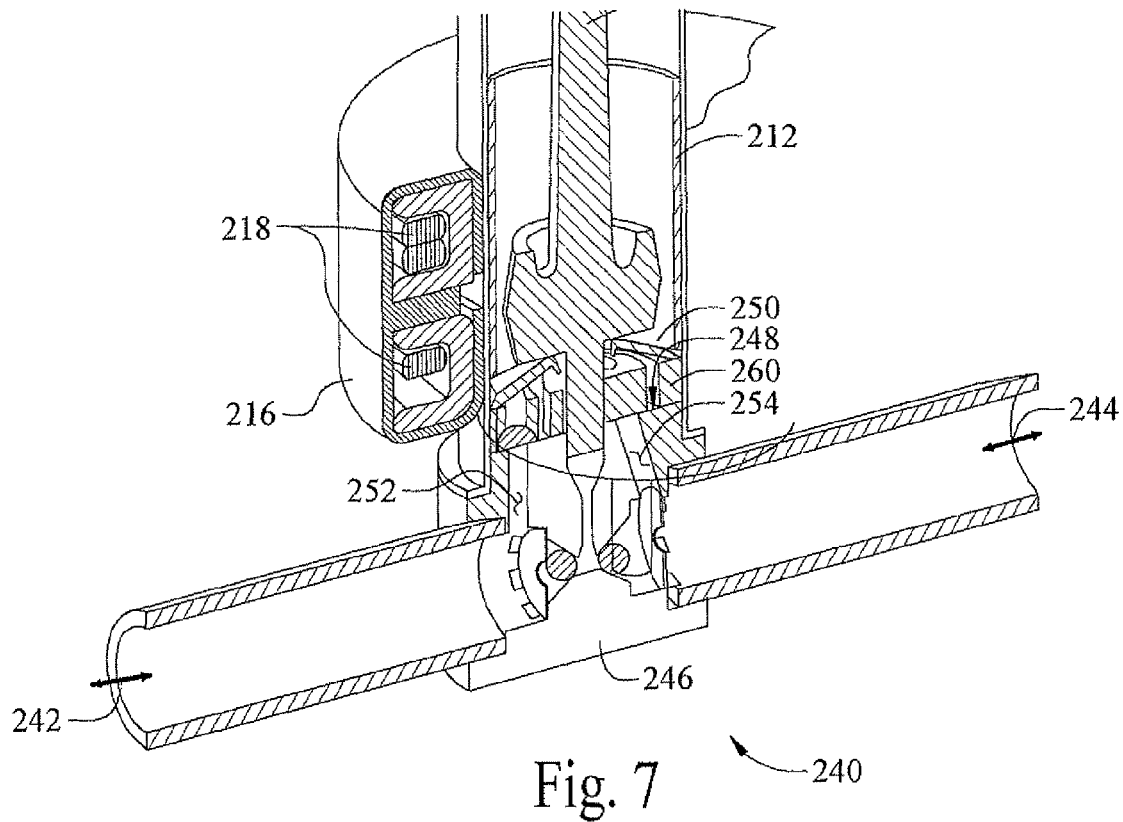
FIG. 7 is a cross-sectional perspective view of the stepper motor and an adjustable flow expansion valve of the second embodiment.

Referring to FIGS. 7-10, the second embodiment further includes an adjustable flow expansion valve 240. The adjustable flow expansion valve 240 comprises a valve housing 246 having a first inlet/outlet 242 and a second inlet/outlet 244 configured for fluid flow in either direction. The adjustable flow expansion valve 240 further includes a valve chamber 250 having a lower wall 248 therein. As shown in FIG. 7, the lower wall of the valve chamber 250 has a first valve port opening 252 in communication with the first inlet/outlet 242, and a second valve port opening 254 in communication with the second inlet/outlet 244. A shaft 284 is rotatably disposed in the valve chamber 250 in a generally vertical or perpendicular orientation relative to the lower wall 248. The rotor 212 is shown coupled to the shaft 284, but may be integrally formed with the shaft 284.

Figure 8:
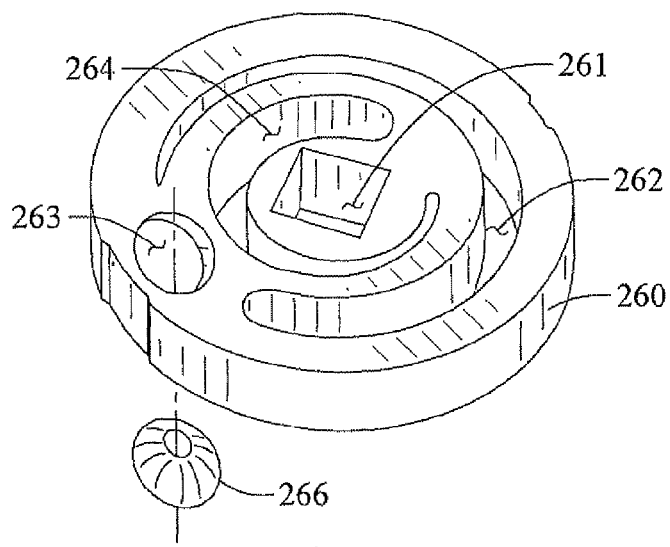
FIG. 8 is a perspective view of a valve element of the expansion valve of the second embodiment shown in FIG. 7.

In the adjustable flow expansion valve 240 of the second embodiment, a first modulating plate or disk 260 is rotatably coupled to the shaft 284. Although the first modulating plate shown in FIGS. 7-10 has a generally round disk-shape, it should be noted that the modulating plate may alternatively comprise a shape other than that of a disk. As shown in FIG. 7, the first modulating disk 260 is disposed in the valve chamber 250 over the first valve port opening 252, and is generally positioned against the lower wall 248 of the valve chamber 250. Referring to FIG. 8, the first modulating disk 260 has a first tapered semi-circular slot 262 that is aligned with the first valve port opening 252 and has a second tapered semi-circular slot 264 that is aligned with the second valve port opening 254 (shown in FIG. 8). The first modulating disk 260 is configured to rotate about its center, by virtue of a central aperture 261 having a keyed configuration. The first modulating disk 260 is configured to rotate from a closed position, in which the first modulating disk 260 is positioned over the first valve port opening 252, to an open position, in which the first and second tapered semi-circular slots 262, 264 are positioned over the first and second valve port openings 252, 254. The first modulating disk 260 may be rotated to varying angles, to adjustably position a wider or narrower portion of the first tapered semi-circular slot 262 over the first valve port opening 252, and a wider or narrower portion of the second tapered semi-circular slot 264 over the second valve port opening 254. This provides for adjustably varying the rate of fluid flow through the first and second valve port openings 252, 254 (and thereby the valve). The stepper motor 210 controllably rotates the first and second disks 260, 266 to incrementally index the first and second tapered semi-circular slots 262, 264 to a plurality of angular positions for incrementally adjusting the rate of fluid flow through the first and second valve port openings 252, 254 and the flow expansion valve 240.

Figure 9:
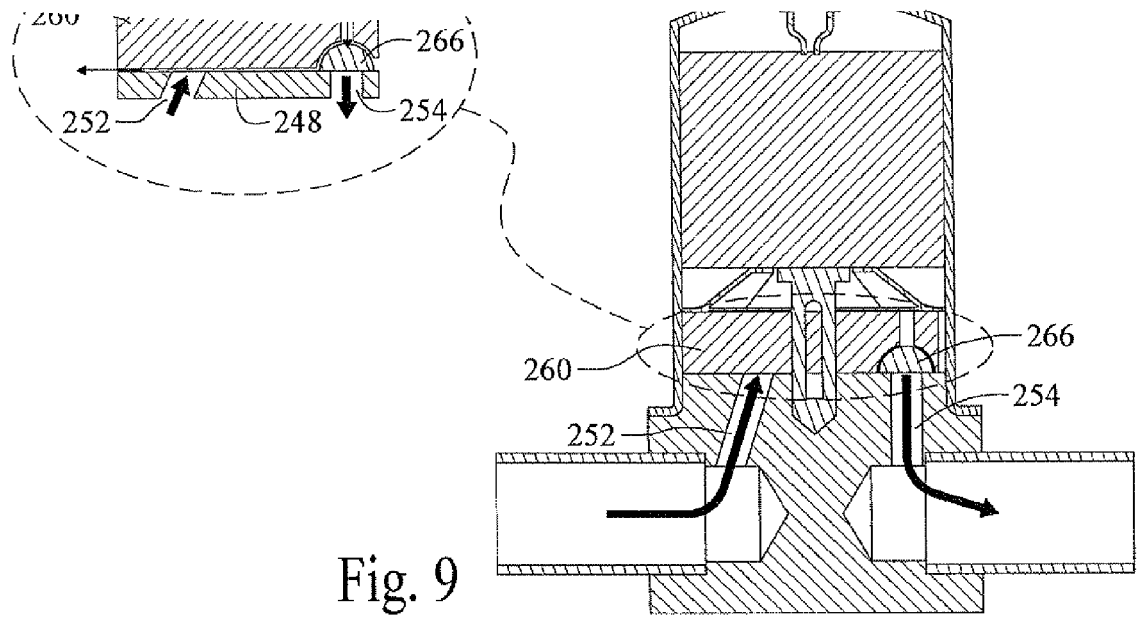
FIG. 9 is a cross-sectional side elevation view of the stepper motor and the adjustable flow expansion valve shown in FIG. 7.
Figure 10:
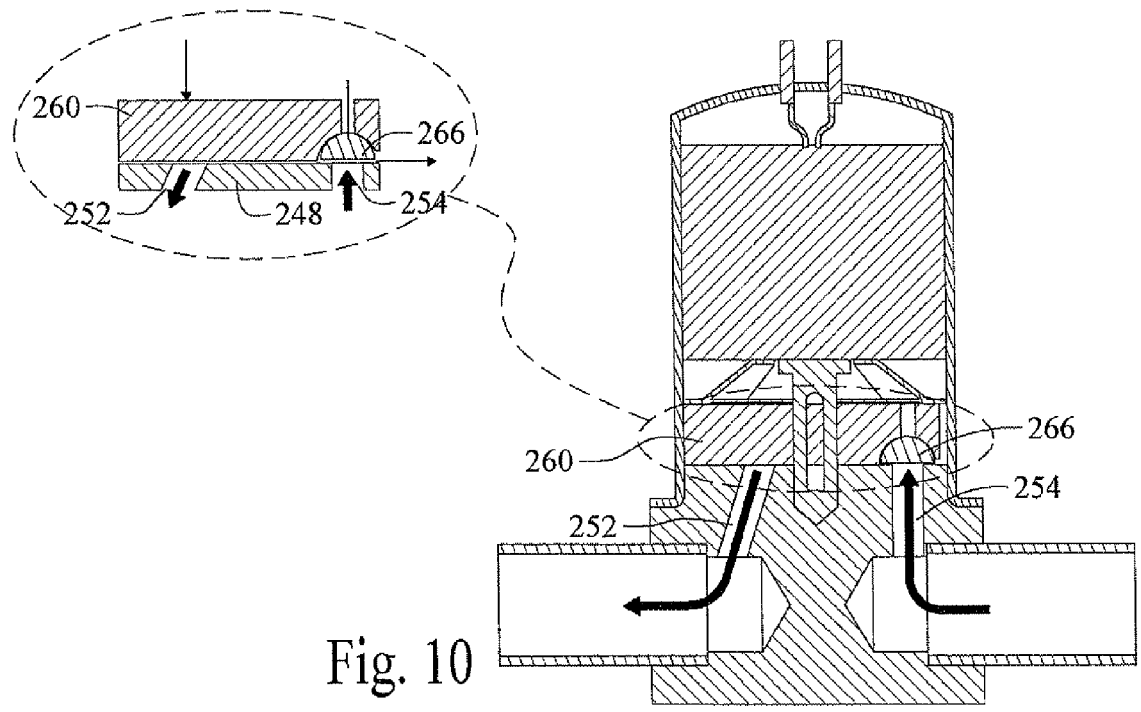
FIG. 10 is a cross-sectional side elevation view of the stepper motor and the adjustable flow expansion valve shown in FIG. 7.

The reversible flow expansion valve 240 shown in FIG. 7-10 further comprises a second pressure-responsive disk 266 disposed within the cavity 263 in the first modulating disk 260, which is confined between the cavity 263 and lower wall 248, such that it is configured to rotate with the first modulating disk 260. As shown in FIG. 9, when the first modulating disk 260 is rotated to the closed position, the second pressure-responsive disk 266 within the cavity 263 is aligned with or positioned over the second valve port opening 254 in a closed position. As shown in FIG. 10, the second pressure-responsive disk 266 is configured to move away from the second valve port opening 254, which permits communication of fluid pressure into the valve chamber 250 that pushes the first modulating disk 260 down over the first valve port opening 252. Thus, the modulating disks 260 and 266 also are configured to be rotated to a closed position in which the valve port openings are closed by the disk 260 or 266. It should be noted that in the first embodiment, the motor 210 is preferably configured to hold its angular orientation and the position of the first and second disks 260, 266 in either an open position or a closed position relative to the valve port openings 252, 254 in the valve housing 246.

Referring back to FIG. 5, the second embodiment further includes a microprocessor 236 that controls the application of a voltage (via 232) to the plurality of stator coils 218 for controllably rotating the rotor 212 to a desired angular displacement position. The microprocessor 236 is configured to control the application of a voltage to the plurality of stator coils, for controllably rotating the rotor 212 and shaft 284 coupled thereto to a desired angular displacement for adjustably varying the fluid flow through the flow expansion valve 240.

Figure 11:
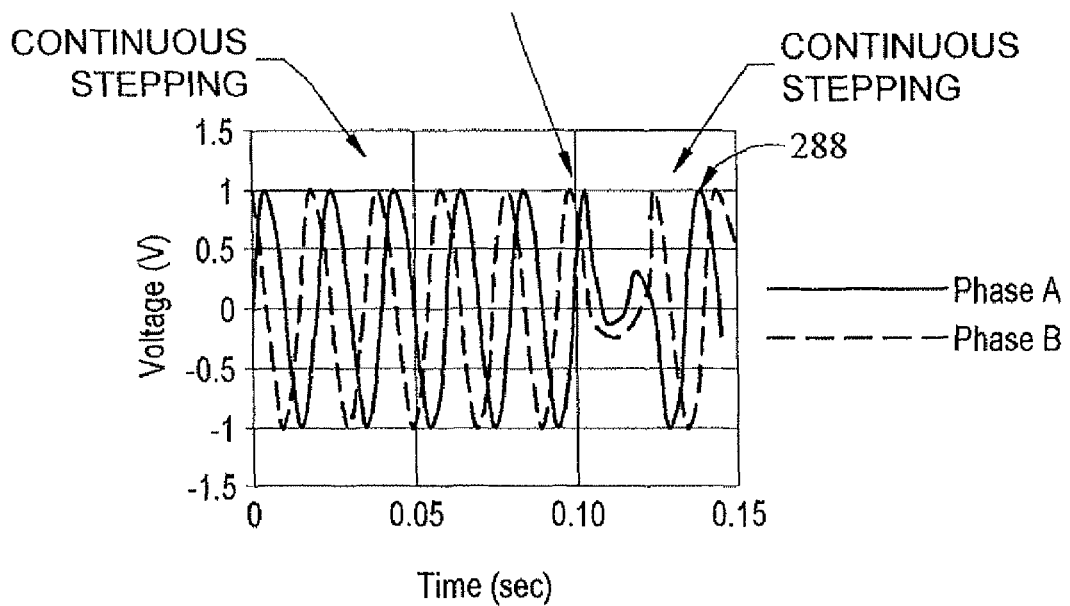
FIG. 11 is a voltage plot showing an induced voltage signal of a first phase and an induced voltage signal of a second phase from the first and second sensing coils shown in FIG. 5.

Rotation of the rotor 212 generates an induced voltage in first sensing coil 220 and the second sensing coil 222 shown in FIG. 5. As shown in FIG. 11, an induced voltage signal of a first phase (286) and an induced voltage signal of a second phase (288) are plotted as outputs of the first and second sensing coils. The induced voltage signal from the first and second sensing coils 220, 222 may be utilized as mathematical components that are used in defining a vector signal for indicating the rotational displacement or position of the rotor.

Figure 12:
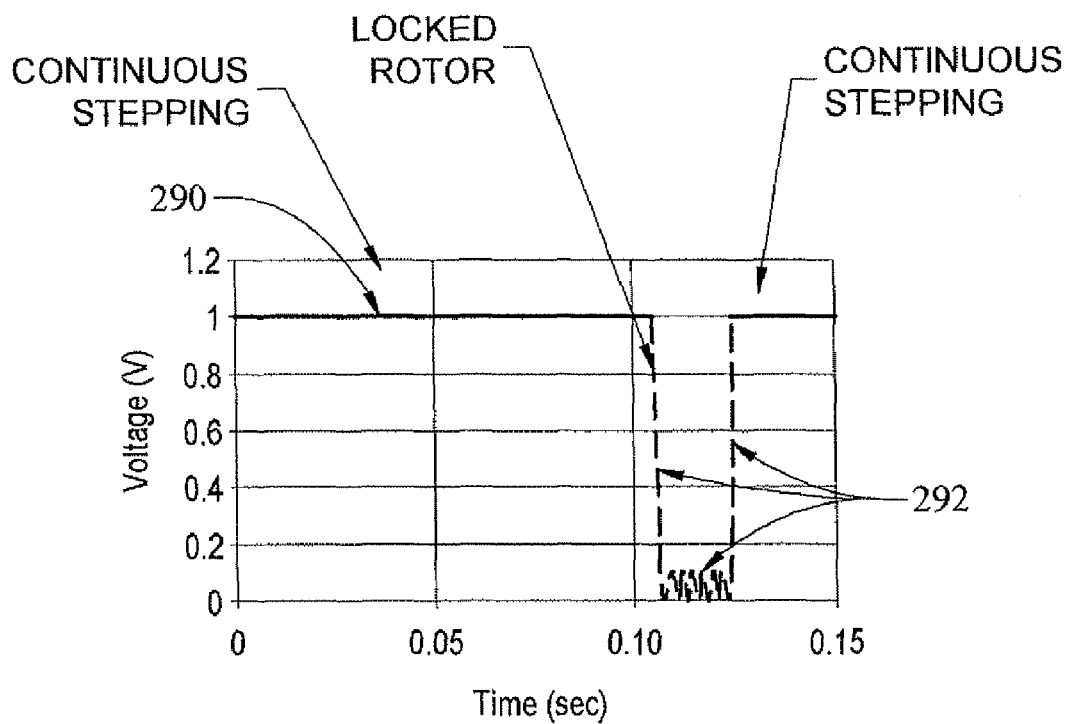
FIG. 12 is a plot showing the output of a constant vector value that is constant and unchanging when the rotor of FIG. 6 rotates in a continuous manner, and the output of a diverging vector value that is indicative of the rotor of FIG. 6 being inhibited from rotating in a continuous manner.
Figure 13:
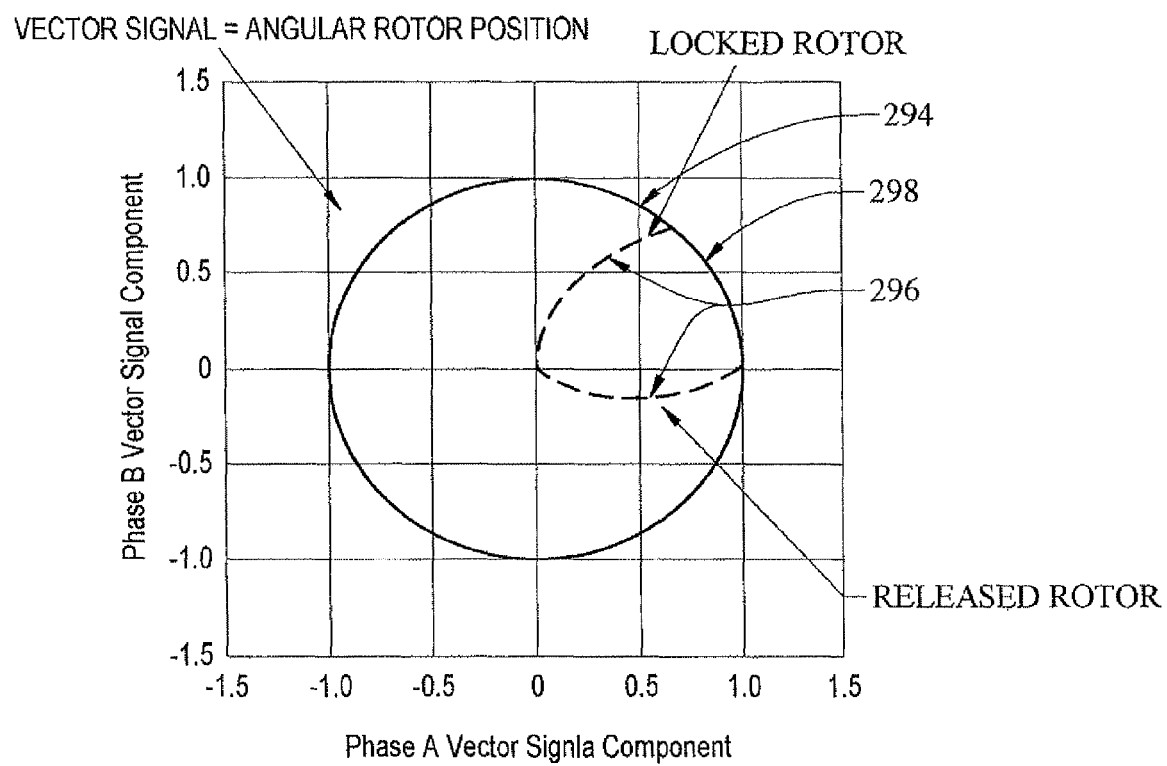
FIG. 13 is a Cartesian plot of the euclidian components of the first phase induced voltage and the second phase induced voltage components that define the vector, which shows the angular position of the rotor of FIG. 6.

The second embodiment further includes a signal conditioning circuit 234 that processes the induced voltage signal from the first and second sensing coils 220, 222. The signal conditioning circuit 234 is configured to process the induced voltage signal of a first phase from the first sensing coil 220 and the induced voltage signal of a second phase from the second sensing coil 222, and to output a vector value. Referring to FIG. 12, a constant vector value 290 is shown that is constant and unchanging where the rotor 212 rotates in a continuous manner. A diverging vector value 292 (which differs from the constant vector value 290) is shown where the rotor 212 is being inhibited from rotating in a continuous manner. The induced voltage signal from the two or more sensing coils 220, 222 are utilized as mathematical components in defining a vector signal value for indicating the rotational displacement or position of the rotor 212. The signal conditioning circuit 234 may be configured to determine a vector value from the mathematical components of the induced voltage signals from the first and second sensing coils, and to output the vector value. The vector values successively output by the signal conditioning circuit 234 would be at a constant vector value 290 that is constant and unchanging where the rotor 212 rotates in a continuous manner. Thus, the constant vector value 290 corresponds to continuous, uninterrupted rotation of the rotor 212, and the diverging vector value 292 that diverges from this constant vector value 290 corresponds to the rotor 212 being inhibited from rotating. Based on this, the microprocessor 236 is configured to detect the rotor's angular displacement position based on the communication of a continuous constant vector value 290 (e.g.,—tracking the constant vector value 290) derived from the induced voltage signal of a first phase from the first sensing coil 220 and induced voltage signal of a second phase from the second sensing coil 222. This allows the microprocessor 236 to thereby track the rotor's angular displacement or position. Specifically, the microprocessor circuit is configured to detect the rotor's angular displacement position by tracking the constant vector value 290 derived from the induced voltage signals from the first and second sensing coils 220, 222 that are indicative of continuous rotation of the rotor 212. Referring to FIG. 13, a Cartesian plot is shown of the euclidian components (e.g.,—the first phase induced voltage signal from the first sensing coil and the second phase induced voltage signal from the second sensing coil) that define the vector signal. This plot shows the rotor's displacement position (each point shows the angular rotation with respect to the origin), which over time completes an entire rotation. The graph in FIG. 13 also shows the plot of a rotor mis-step where the euclidian components (e.g.,—the first phase induced voltage signal from the first sensing coil and the second phase induced voltage signal from the second sensing coil) result in a vector signal value that differs from that of the constant vector value (e.g. the radius of the plotted circle). Accordingly, the microprocessor 236 may be configured to track the rotor's angular displacement position by tracking the constant vector value 290 derived from the induced voltage signals from the first and second sensing coils 220, 222 that are indicative of continuous rotation of the rotor 212. The microprocessor circuit may be further configured to determine the rate of angular displacement of the rotor 212 based on the amplitude of the induced voltage signal from the first and second sensing coils 220, 222.

Figure 14:
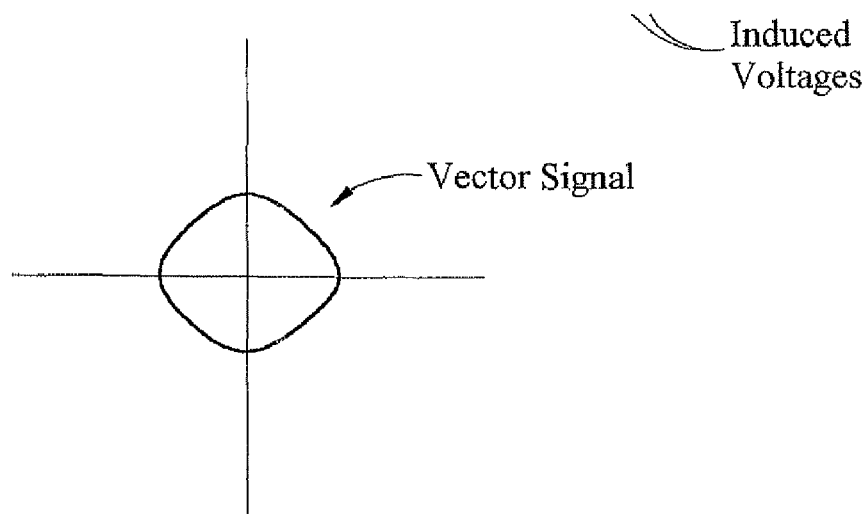
FIG. 14 is a plot of the induced voltage vector signal as the stepper motor rotor rotates in a continuous, uninterrupted manner.

Based on the signals from the first and second sensing coils 220, 222 the microprocessor 236 is configured to monitor the induced voltage signals of the first and second sensing coils 220, 222, to detect a constant vector value 290 output by the signal conditioning circuit 234 that does not change in value (where the induced voltage signals are indicative of the rotor 112 rotating in a continuous manner). Referring to FIG. 14, a plot is shown of the induced voltage signal of a first phase and an induced voltage signal of a second phase, from the first and second sensing coils. FIG. 14 further shows a graph of the vector components (of the first phase induced voltage signals and second phase induced voltage signal) plotted over time. The magnitude of the vector components (e.g.,—radial distance "d" from the point of origin 0,0,0) remains constant, and the time evolution of the vector components/vector signal value retrace the same rotational track in a constant manner. Thus, the microprocessor 236 is configured to track the rotor's rotational displacement position, by determining the angular displacement of the rotor 212 based on the constant vector value 290 and the induced voltage signal from the first and second sensing coils 220, 222.

Figure 15:
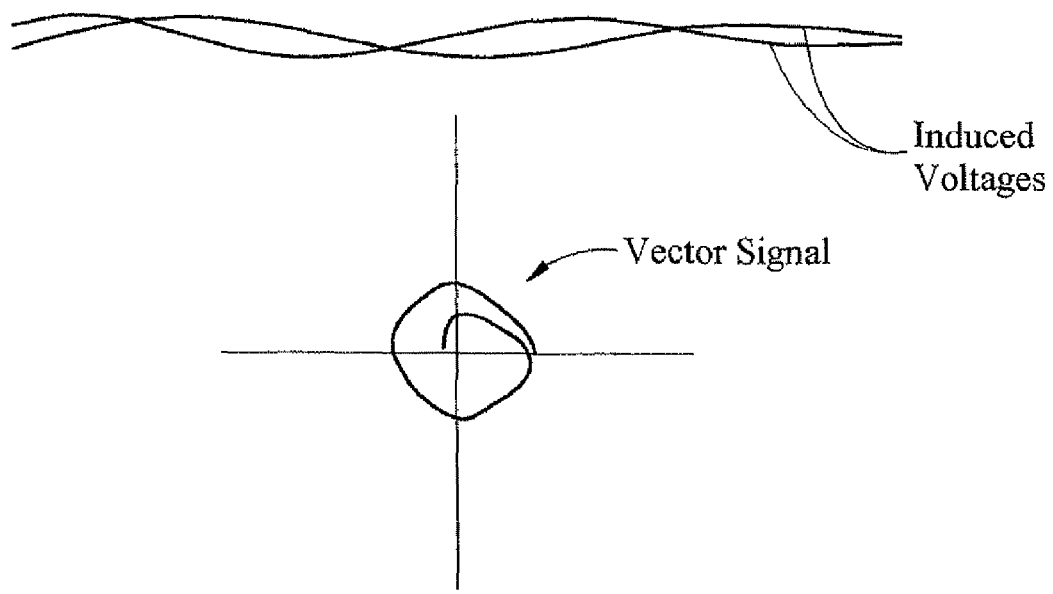
FIG. 15 is a plot of the induced voltage vector signal at the moment of a stepper motor mis-step.

Similarly, the microprocessor 236 is configured to detect a diverging vector value 292 output by the signal conditioning circuit 234 that diverges or differs from the constant vector value 290 (where the induced voltage signals from the first and second sensing coils 220, 222 are indicative of the rotor 212 being inhibited from rotating in a continuous manner). Referring to FIG. 15, a plot is shown of the induced voltage signal of a first phase and an induced voltage signal of a second phase, at the moment of a rotor mis-step, where the magnitude of the induced voltage signals gradually decreases. FIG. 15 further shows a graph of the vector components, where the magnitude of the vector components/vector signal decreases gradually and drops to zero. The spiral shape of the evolution of the vector signal shows the magnitude or value diverging from the constant track, and indicates that the rotor was rotating counterclockwise as the rotor experienced a mis-step. Thus, the microprocessor 236 is configured to detect the occurrence of a mis-step. The microprocessor 236 accordingly controls the application of voltage to the plurality of stator coils 218 to effect rotation of the rotor 212, which causes an induced current in the first and second sensing coils 220, 222 that the signal conditioning circuit 234 processes to provide a vector value indicating whether or not the rotor 212 is rotating continuously, which vector value is tracked by microprocessor 236 for use in determining the angular or rotational displacement of the rotor 212. Likewise, if the induced voltage is measured at zero volts when the microprocessor 236 applies a voltage to the plurality of stator coils for effecting rotation of the rotor 212, it can be concluded that the rotor 212 failed to complete the desired step rotation (thereby failing to induce a voltage in the sensing coil), which would signal a mis-step.

Figure 16:
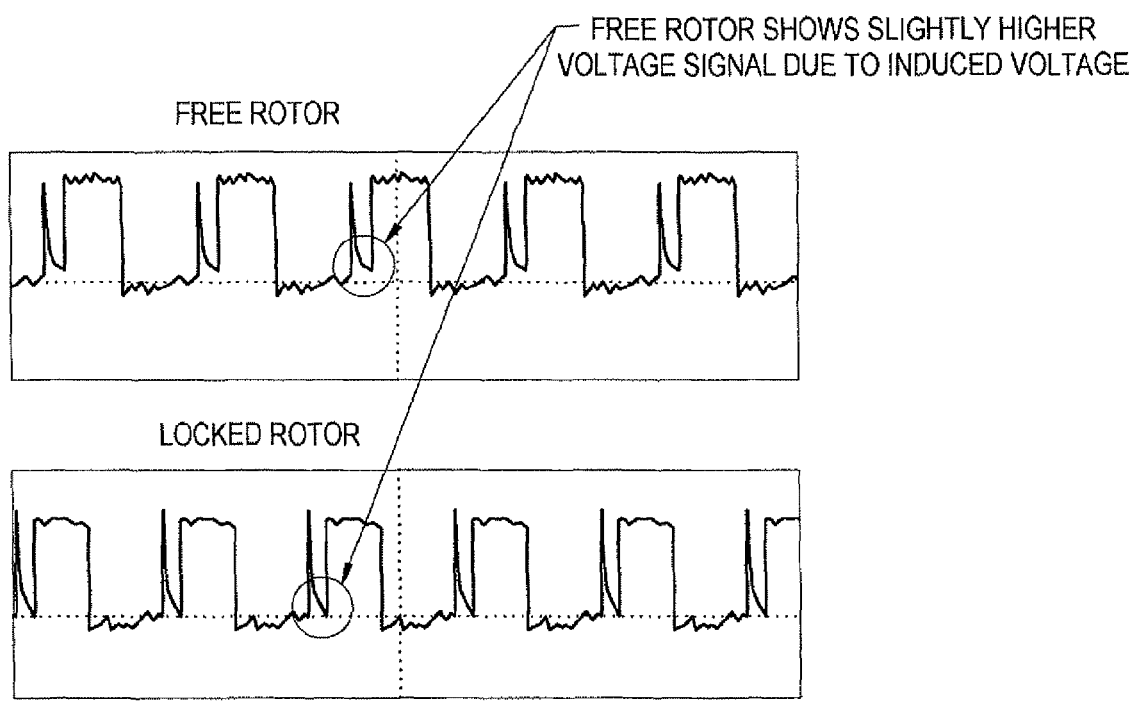
FIG. 16 is a plot of a voltage signal from a stator coil winding of a conventional stepper motor, for comparison to the induced voltage vector signal of the present disclosure.

Referring to FIG. 16, a plot is shown of a voltage signal from a stator coil winding of a conventional stepper motor, for comparison to the induced voltage vector signal of the present disclosure. The stator coil windings of conventional stepper motors that are powered to effect rotation have also been utilized to sense an induced voltage for sensing rotor rotational displacement. The graph in FIG. 16 illustrates the result of connecting a sensing circuit to the stepper motor stator coils of a conventional stepper motor, for sensing an induced voltage caused by rotation of the rotor. It can be seen that the induced voltage is fairly small with respect to the power voltage signal used to actually drive the stepper motor. Accordingly, very complex filtering and signal conditioning circuits would be needed in order to separate the power signals from the induced voltages caused by the rotor displacement. Thus, the sensing of rotor displacement via the conventional approach of using stator coil windings as sensors is significantly inferior to the various embodiments of the present disclosure, which provides a more robust rotor displacement tracking feature.

It should be noted that any of the preceding exemplary embodiments, various features may be combined, substituted or omitted. Alternative constructions of one or more of the above exemplary embodiments may include various combinations of the above disclosed features. For example, various alternate embodiments may include or omit either of the disclosed check valve designs, and bleed valve passage, and may further include or omit the biasing spring. Additionally, the above exemplary embodiments may comprise various alternate constructions of the modulating member, in which various designs of a slot or groove having varying cross-sectional width may be employed to gradually change the effective opening area through which fluid may flow through the valve.

Accordingly, the description of the various embodiments above is merely exemplary in nature and, thus, variations that do not depart from the gist of the invention are intended to be within the scope of the invention. Additional design considerations, such as the control of the application of voltage to the stepper motor, may be incorporated without departing from the spirit and scope of the invention. Such variations are not to be regarded as a departure from the spirit and scope of the invention. Accordingly, it is not intended that the invention be limited by the particular embodiment or form described above, but by the appended claims.

Terms such as "upper," "lower," "inner," "outer," "vertically," "horizontally," "inwardly," "outwardly," and the like when used herein refer to positions of the respective elements as they are shown in the accompanying drawings, and the disclosure is not necessarily limited to such positions.

The foregoing description of the embodiments of the present invention has been provided for purposes of illustration and description. It is not intended to be exhaustive or to limit the invention to the precise forms disclosed. Individual elements or features of a particular embodiment are generally not limited to that particular embodiment, but, where applicable, are interchangeable and can be used in an selected embodiment, even if not specifically shown or described.

What is claimed is:

1. A stepper motor in combination with a controller and a valve, which provide for controllably adjusting the valve to vary fluid flow therethrough, the combination comprising:
  a valve that is configured to be rotatably displaced to thereby adjustably vary the fluid flow rate through the valve;
  a shaft rotatably coupled to the valve;
  a stepper motor having a rotor coupled to the shaft, and a stator, the stator having a plurality of stator coils that are configured to effect rotation of the rotor upon application of a voltage to the plurality of stator coils, for rotatably stepping the rotor to a desired angular displacement;
  one or more sensing coils disposed in the stator such that rotation of the rotor generates an induced voltage in each of the one or more sensing coils, wherein each of the one or more sensing coils are configured to output an induced voltage signal;
  a controller that receives the induced voltage signal from the one or more sensing coils and determines a vector value based on the induced voltage signal from the one or more sensing coils, the controller being configured to output a constant vector value that does not change in value while the rotor rotates in a continuous manner, and to output a diverging vector value when the rotor is inhibited from rotating in a continuous manner, the controller being configured to determine the angular displacement of the rotor based on the constant vector value and the induced voltage signal from the one or more second sensing coils, the controller being further configured to detect the occurrence of a diverging vector value indicative of the rotor being inhibited from rotating in a continuous manner, and to resume tracking the rotor step position upon restoration of continuous rotation of the rotor, to thereby track the rotor's actual angular displacement position with precision.

2. The stepper motor combination of claim 1, wherein the controller further includes a microprocessor circuit configured to control the application of a voltage to the plurality of stator coils, for controllably rotating the rotor and shaft coupled thereto to a desired angular displacement for adjustably varying the fluid flow through the valve.

3. The stepper motor combination of claim 1, wherein the one or more sensing coils comprise at least a first sensing coil and a second sensing coil, each of which is configured to output an induced voltage signal.

4. The stepper motor combination of claim 3, wherein the induced voltage signal from the first sensing coil and the induced voltage signal from the second sensing coil are each components that are used in defining a vector signal.

5. The stepper motor combination of claim 4, further comprising a signal conditioning circuit that processes the induced voltage signal from the first and second sensing coils, the signal conditioning circuit being configured to output the constant vector value where the induced voltage signal from the first sensing coil and induced voltage signal from the second sensing coil are indicative of continuous uninterrupted rotation of the rotor, and to output a diverging vector value that differs from the constant vector value where the induced voltage signal from the first sensing coil and induced voltage signal from the second sensing coil are indicative of the rotor being inhibited from rotating in a continuous manner.

6. The stepper motor combination of claim 5, wherein the controller is configured to detect the rotor's angular displacement position by tracking the constant vector value derived from the induced voltage signals from the first and second sensing coils that are indicative of continuous rotation of the rotor, to thereby track the rotor's angular displacement position.

7. The stepper motor combination of claim 5, wherein the controller is further configured to determine the rate of angular rotor displacement based on the amplitude of the induced voltage signal from the first and second sensing coils.

8. The stepper motor combination of claim 1, wherein the controller is configured to determine a vector signal value based on the induced voltage signal from the one or more sensing coils, and further configured to determine continuous rotor rotation where the signal vector value remains constant.

9. A stepper motor in combination with a controller, for controllably adjusting the angular displacement of a rotor of the stepper motor, the combination comprising:
a stepper motor having a rotor coupled to the shaft, and a stator, the stator having a plurality of stator coils therein defining at least two phases that are configured to effect rotation of the rotor upon application of a voltage to the plurality of stator coils, for rotatably stepping the rotor to a desired angular displacement;
one or more sensing coils disposed in the stator such that rotation of the rotor generates an induced voltage in each of the one or more sensing coils, wherein each of the one or more sensing coils are configured to output at least one induced voltage signal;
a controller that applies a voltage to the plurality of stator coils for controllably rotating the rotor to a desired angular displacement position, and further processes the induced voltage signals from the one or more sensing coils, the controller being configured to output a constant vector value that does not change in value where the induced voltage signals are indicative of the rotor rotating in a continuous manner, and to output a diverging vector value where the induced voltage signals are indicative of the rotor being inhibited from rotating in a continuous manner, said controller being configured to determine the angular displacement of the rotor based on the constant vector value and the induced voltage signal from the one or more sensing coils, and further configured to detect the occurrence of a diverging vector value indicative of the rotor being inhibited from rotating in a continuous manner, and to resume tracking the rotor step position upon restoration of the constant vector value that is indicative of continuous rotation of the rotor, to thereby track the rotor's actual angular displacement position with precision.

10. The stepper motor combination of claim 9, wherein the one or more sensing coils comprise at least a first sensing coil and a second sensing coil, each of which is configured to output an induced voltage signal.

11. The stepper motor combination of claim 10, wherein the induced voltage signal from the first sensing coil and the induced voltage signal from the second sensing coil are each components that define a vector signal.

12. The stepper motor combination of claim 11, further comprising a signal conditioning circuit that processes the induced voltage signal from the first and second sensing coils, the signal conditioning circuit being configured to output the constant vector value where the induced voltage signal from the first sensing coil and induced voltage signal from the second sensing coil are indicative of continuous uninterrupted rotation of the rotor, and to output a diverging vector value that differs from the constant vector value where the induced voltage signal from the first and second sensing coils are indicative of the rotor being inhibited from rotating in a continuous manner.

13. The stepper motor combination of claim 11, wherein the controller is configured to detect the rotor's angular displacement position by tracking the constant vector value derived from the induced voltage signals from the first and second sensing coils that are indicative of continuous rotation of the rotor, to thereby track the rotor's angular displacement position.

14. The stepper motor combination of claim 11, wherein the controller is further configured to determine the rate of angular displacement of the rotor based on the amplitude of the induced voltage signal from the first and second sensing coils.

15. A stepper motor in combination with a controller, for controllably adjusting the angular displacement of a rotor, the combination comprising:
a stepper motor having a rotor coupled to the shaft, and a stator, the stator having a plurality of stator coils therein defining at least two phases that are configured to effect rotation of the rotor upon application of a voltage to the plurality of stator coils, for rotatably stepping the rotor to a desired angular displacement;
first and second sensing coils positioned adjacent to the at least two of the plurality of stator coils and disposed in the stator such that rotation of the rotor generates an induced voltage in each of the first and second sensing coils, wherein the first sensing coil is configured to output an induced voltage signal of a first phase and the second sensing coil is configured to output an induced voltage signal of a second phase;
a signal conditioning circuit configured to process the induced voltage signal of a first phase from the first sensing coil and the induced voltage signal of a second phase from the second sensing coil, wherein the induced voltage signal of a first phase from the first sensing coil and the induced voltage signal of a second phase from the second sensing coil are each components that are used in defining a vector value, the signal conditioning circuit being configured to output a constant vector value that is constant and unchanging where the rotor rotates in a continuous manner, and to output a diverging vector value that differs from the constant vector value where the rotor is being inhibited from rotating in a continuous manner;
a microprocessor circuit configured to control the application of a voltage to the plurality of stator coils, for controllably rotating the rotor to a desired angular displacement, the microprocessor being configured to determine the angular displacement of the rotor based on the communication of a continuous constant vector value, derived from the induced voltage signal of a first phase from the first sensing coil and induced voltage signal of a second phase from the second sensing coil, said microprocessor circuit being further configured to detect the occurrence of a diverging vector value indicative of the rotor being inhibited from rotating in a continuous manner, and to resume tracking the rotor step position upon restoration of the constant vector value that is indicative of continuous rotation of the rotor, to thereby track the rotor's actual angular displacement position with precision.

16. A stepper motor in combination with a controller and a valve, which provide for controllably adjusting the valve to vary fluid flow therethrough, the combination comprising:

a valve element disposed within the valve that is configured to be rotatably displaced to adjustably vary the fluid flow rate through the valve;

a shaft rotatably coupled to the valve element;

a stepper motor having a rotor coupled to the shaft, and a stator, the stator having a plurality of stator coils therein defining at least two phases that are configured to effect rotation of the rotor upon application of a voltage to the plurality of stator coils, for rotatably stepping the rotor to a desired angular displacement;

first and second sensing coils positioned adjacent to the at least two of the plurality of stator coils and disposed in the stator such that rotation of the rotor generates an induced voltage in each of the first and second sensing coils, wherein the first sensing coil is configured to output an induced voltage signal of a first phase and the second sensing coil is configured to output an induced voltage signal of a second phase;

a signal conditioning circuit configured to process the induced voltage signal of a first phase from the first sensing coil and the induced voltage signal of a second phase from the second sensing coil, the signal conditioning circuit being configured to output a constant vector value that is constant and unchanging where the rotor rotates in a continuous manner, and to output a diverging vector value that differs from the constant vector value where the rotor is being inhibited from rotating in a continuous manner;

a microprocessor circuit configured to control the application of a voltage to the plurality of stator coils, for controllably rotating the rotor and shaft coupled thereto to a desired angular displacement for adjustably varying the fluid flow through the valve, the microprocessor being configured to determine the angular displacement of the rotor based on the communication of a continuous constant vector value, derived from the induced voltage signal of a first phase from the first sensing coil and induced voltage signal of a second phase from the second sensing coil, said microprocessor circuit being further configured to detect the occurrence of a diverging vector value indicative of the rotor being inhibited from rotating in a continuous manner, and to resume tracking the rotor step position upon restoration of the constant vector value that is indicative of continuous rotation of the rotor, to thereby track the rotor's actual angular displacement position with precision.

17. The stepper motor combination of claim 16, wherein the induced voltage signal from the first sensing coil and the induced voltage signal from the second sensing coil are each components that are used in defining a vector value signal.

18. The stepper motor combination of claim 17, wherein the signal conditioning circuit processes the induced voltage signal from the first and second sensing coils, the signal conditioning circuit being configured to output the constant vector value that is constant and unchanging where the induced voltage signal from the first sensing coil and induced voltage signal from the second sensing coil are indicative of continuous uninterrupted rotation of the rotor, said signal conditioning circuit being further configured to output a diverging vector value that differs from the constant vector value where the induced voltage signal from the first and second sensing coils are indicative of the rotor being inhibited from rotating in a continuous manner.

19. The stepper motor combination of claim 18, wherein the microprocessor circuit is configured to detect the rotor's angular displacement position by tracking the constant vector value derived from the induced voltage signals from the first and second sensing coils that are indicative of continuous rotation of the rotor, to thereby track the rotor's angular displacement position.

20. The stepper motor combination of claim 19, wherein the microprocessor circuit is further configured to determine the rate of angular displacement of the rotor based on the amplitude of the induced voltage signal from the first and second sensing coils.

* * * * *